US008555156B2

(12) United States Patent
Cairns

(10) Patent No.: US 8,555,156 B2
(45) Date of Patent: Oct. 8, 2013

(54) INFERRING THAT A MESSAGE HAS BEEN READ

(75) Inventor: Brian L. Cairns, Fort Collins, CO (US)

(73) Assignee: Google Inc., Mountain View, CA (US)

(*) Notice: Subject to any disclaimer, the term of this patent is extended or adjusted under 35 U.S.C. 154(b) by 656 days.

(21) Appl. No.: 12/856,834

(22) Filed: Aug. 16, 2010

(65) Prior Publication Data

US 2012/0042267 A1 Feb. 16, 2012

(51) Int. Cl.
*G06F 17/00* (2006.01)
(52) U.S. Cl.
USPC ........... 715/234; 715/246; 715/247; 715/743; 715/734; 434/178; 434/179
(58) Field of Classification Search
USPC ................ 715/234, 246, 247, 781, 743, 734; 434/178, 179
See application file for complete search history.

(56) References Cited

U.S. PATENT DOCUMENTS

| | | |
|---|---|---|
| 2006/0277504 A1 | 12/2006 | Zinn |
| 2008/0270560 A1 | 10/2008 | Tysowski et al. |
| 2009/0316198 A1 | 12/2009 | Takeuchi et al. |
| 2010/0042570 A1 | 2/2010 | Mayers et al. |

FOREIGN PATENT DOCUMENTS

EP 1372316 12/2003

OTHER PUBLICATIONS

Suzanne100, Use Outlook Reading Pane without marking messages as read, May 13, 2010, The Productivity Hub, pp. 1-2 http://blogs.technet.com/b/hub/archive/2010/05/13/use-outlook-reading-pane-without-marking-messages-as-read.aspx.*
Elvind Savio, How to Identify if Visitors are Reading Your Articles with Google Analytics, Aug. 9, 2010, Savio.no, pp. 1-5 http://www.savio.no/blogg/a/95/how-to-identify-if-visitors-are-reading-your-articles-with-google-analytics.*
International Search Report and Written Opinion in Application No. PCT/US2011/047331, dated Feb. 27, 2012.
Leverman et al., "SC07 Cluster Challenge: A Student Perspective", Proceedings of the 2007 ACM/IEEE Conference on Supercomputing, [online] Retrieved from the Internet: <URL: http://www.linuxclustersinstitute.org/conferences/archive/2008/PDF/Leverman 20901.pdf>, (Nov. 2007).
vBulletin, Landing Page/General Information, [online], Retrieved from the Internet: <URL: http://www.vbulletin.com>, (© 2011).
"phpBB • Free and Open Source Forum Software", [online] Retrieved from the Internet: <URL: http://www.phpbb.com/community/viewforum.php?f=14 >, pp. 1 to 6 (retrieved Mar. 23, 2011).

(Continued)

*Primary Examiner* — Adam M Queler
*Assistant Examiner* — Howard Cortes
(74) *Attorney, Agent, or Firm* — Birch, Stewart, Kolasch & Birch, LLP

(57) ABSTRACT

A technique for inferring whether a message has been read includes the following: identifying at least part of a message that is in a viewport of a computing device, determining a value that is based on the at least part of the message, comparing the value to a threshold, tracking an amount of time that the at least part of the message is in the viewport if the value meets or exceeds the threshold, and inferring whether the message has been read based on the amount of time.

36 Claims, 10 Drawing Sheets

(56) References Cited

OTHER PUBLICATIONS

Invision Power, "IP.Board Forum Software", [online], Retrieved from the Internet: <URL: http://www.invisionpower.com/products/board/> (© 2009).

Google, "Map Your World Community: Official Home of Map Maker Community Discussions", [online], Retrieved from the Internet: <URL: http://sites.google.com/site/mapyourworldcommunity/> (Mar. 2011).

Invision Power Services, "IP.Board Forum Announcements", [online], Retrieved from the Internet: <URL: http://community.invisionpower.com/forum/1-announcements/> (Feb. 2011).

phpBB.com, "phpBB View Forum—Announcements" [online], Retrieved from the Internet: URL: http://www.phpbb.com/community/viewforum.php?f=14> (© 2006-2011).

vBulletin—Forum: vBulletin Announcements, [online], Retrieved from the Internet: <URL: http://www.vbulletin.com/forum/forumdisplay.php/1-vBulletin-Announcements>, (Oct. 7, 2010).

Knuth, Donald, The Art of Computer Programming, 2nd Ed., vol. 3—Sorting and Searching ( (c) 1998) Addison Wesley Longman, pp. 409-426.

International Preliminary Report on Patentability for corresponding application PCT/US2011/047331, dated Feb. 28, 2013.

\* cited by examiner

INFERRING THAT A MESSAGE HAS BEEN READ

TECHNICAL FIELD

This patent application relates generally to inferring that a message displayed on a computer display screen has been read.

BACKGROUND

A discussion forum contains topics of conversation, and messages relating to those topics. Typically, each message identifies a participant in the forum and includes message text and other indicia, such as when the message was posted. Other users can respond to an "original" message by clicking on a "reply" button or some other graphical element, and posting their own thoughts on the message or on the topic in general. Response messages may be embedded under corresponding original messages, resulting in a message hierarchy that is accessible to users of the forum. Alternatively, a "flat view" may be presented, in which there is no message hierarchy.

A message list is typically displayed in a viewport, which is a user interface (UI) generated by a Web browser. The size and shape of the viewport can be changed. Nevertheless, the list of messages in a forum is often too long to fit in a viewport. Typically, only a small fraction of the entire message hierarchy is visible from the viewport. Users therefore scroll through the list of messages, and may read, or ignore, messages that appear in the viewport.

It may be desirable to identify which messages in a discussion forum have been read. Doing so enables a sponsor of the forum to identify subjects that have generated a certain amount of interest, and to direct forum readers to content (e.g., Web sites or other forums) that provides more information on those topics.

One way to identify which messages in a discussion forum (or any other computer-generated message list) have been read is to associate a graphical element, such as a checkbox, with each message. A user may interact with the graphical element to indicate when the user has read a message. For example, a user may place a check in the checkbox.

Another way to identify which messages in a discussion forum have been read is to identify messages that have been loaded into a user's browser for, e.g., individual display. In this type of system, it may be assumed that all messages that have been loaded have been read.

SUMMARY

In general, this patent application describes techniques for inferring whether a message has been read. An example of such a technique includes the following: identifying at least part of a message that is in a viewport of a computing device, determining a value that is based on the at least part of the message, where the value is indicative of whether the message has been read, comparing the value to a threshold, tracking an amount of time that the at least part of the message is in the viewport if the value meets or exceeds the threshold, and inferring whether the message has been read based on the amount of time. This example may include one or more of the following features, or any others described in this patent application, either alone or in combination.

A process for identifying at least part of a message that is in a viewport may include performing a binary search on a list of messages that the message is among in order to identify the message that is in a viewport. The value may be determined based on at least one of a percentage of the message in the viewport or a percentage of the viewport that is filled by the message. The percentage of the message in the viewport may be determined by performing a calculation using a boundary of the message and a boundary of the viewport. The boundary of the viewport may be obtained by querying a Web browser that displays the viewport. The value may be determined by selecting whichever of the following is greater: the percentage of the message in the viewport and the percentage of the viewport that is filled by the message.

The above example may also include selecting the message by determining that the message has not moved relative to the viewport for at least a period of time.

The message may be in a list of messages. A process for identifying at least part of the message that is in a viewport may include the following: (a) selecting a test message from among the list of messages, and (b) determining a location of the test message relative to the viewport. If none of the test message is in the viewport, (a) and (b) may be repeated until at least part of a selected test message is determined to be in the viewport. The process may then proceed using, as the message, a first test message that is determined to be at least partly in the viewport. In each new iteration of (a) and (b), a test message may be selected from a subset of the messages that is smaller than a subset of the messages used for a previous iteration of (a) and (b). In each new iteration of (a) and (b), the subset of the messages may exclude messages known not to be in the viewport.

The above example may also include the following: identifying at least part of a second message that is in the viewport of the computing device, determining a second value that is based on the at least part of the second message, comparing the second value to the threshold, tracking a second amount of time that the at least part of the second message is in the viewport if the second value meets or exceeds the threshold, and inferring whether the second message has been read based on the second amount of time. Identifying the at least part of the second message may include searching for the at least part of the second message in the viewport starting at a location associated with the first message.

In another example, a technique for inferring whether a message has been read includes the following: determining that a message in a list of messages has not moved relative to a viewport of a Web browser displayed on a computing device, tracking a time during which at least part of the message is displayed in the viewport, and inferring that the message has been read if the time exceeds a predefined period of time. This example may include one or more of the following features, or any others described in this patent application, either alone or in combination.

The at least part of the message may be associated with a characteristic that exceeds a value associated with a size of the viewport. The characteristic may correspond to a percentage of the message in the viewport or a percentage of the viewport that is filled by the message. This example may also include performing a binary search to identify the message from among the list of messages.

All or part of the foregoing techniques, and variations thereon, may be implemented as a computer program product that includes instructions that are stored on one or more non-transitory machine-readable storage media, and that are executable on one or more processing devices. All or part of the foregoing techniques may be implemented as an apparatus, method, and/or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF DRAWINGS

FIG. 1, which includes

Like reference symbols in the various drawings indicate like elements.

DETAILED DESCRIPTION

Described herein is a process for making an inference as to whether one or more messages in a list of messages has been read. The process includes identifying at least part of a message that is in a viewport of a display screen, and determining a value that is based on at least part of the message. The value may be the percentage of the message that is in the viewport or the percentage of the viewport that is occupied by the message. The process includes comparing this value to a threshold, and tracking an amount of time that the message is in the viewport if the value meets or exceeds the threshold. An inference is made that the message has been read if the value continues to exceed the threshold while the message stays in the viewport for more than a specified amount of time.

FIG. 1 is a conceptual view of the foregoing process for making an inference as to whether a message has been read. The process may be implemented by software, which is referred to here as a read detector. The process may run on the same computing device as a browser that displays messages relating to a topic in a discussion forum, and may be used to infer whether messages in that message list have been read.

Figure 1A:
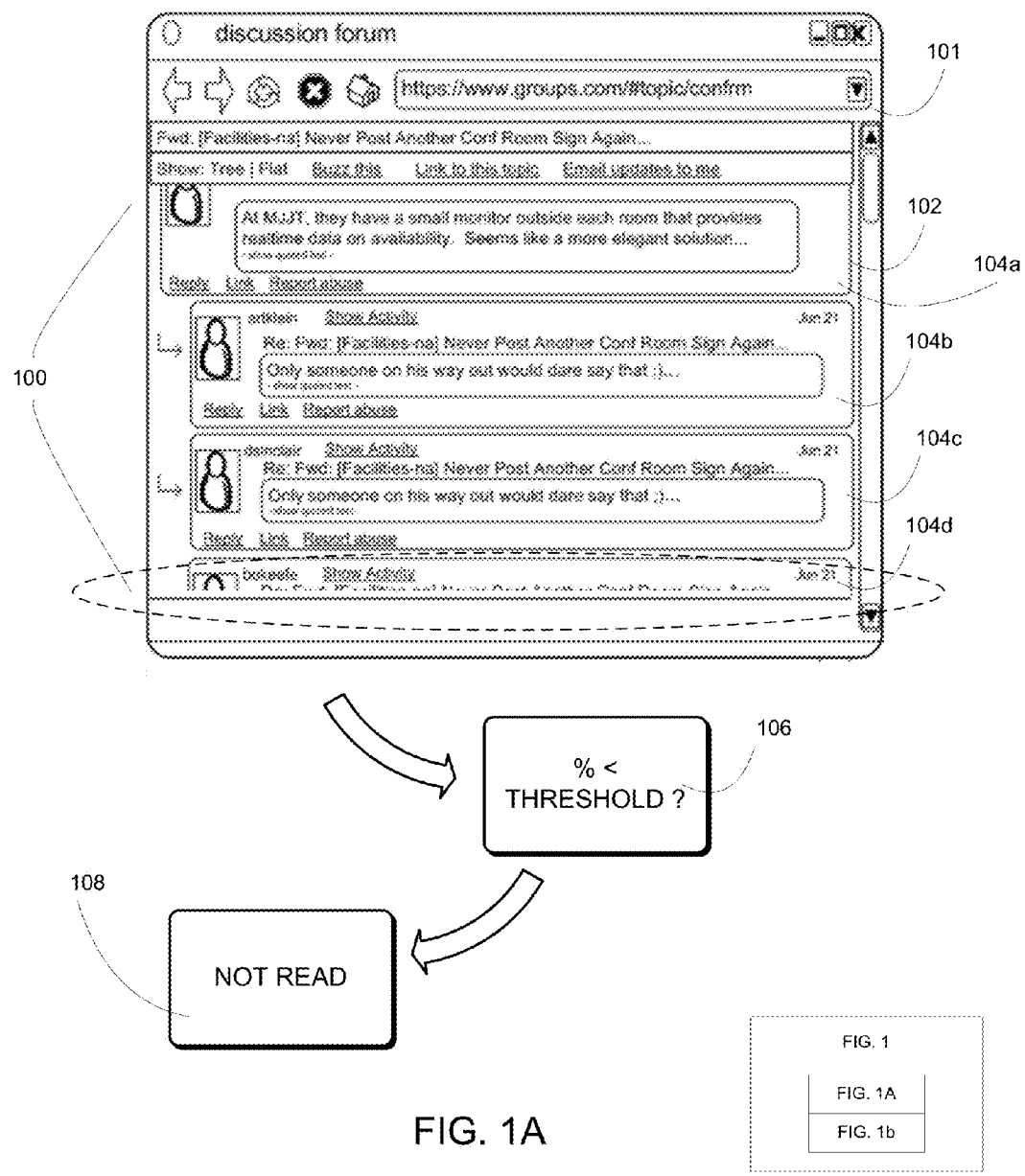
FIGS. 1a and FIG. 1b, shows conceptual views of a process for making an inference as to whether a message has been read.
Figure 1B:
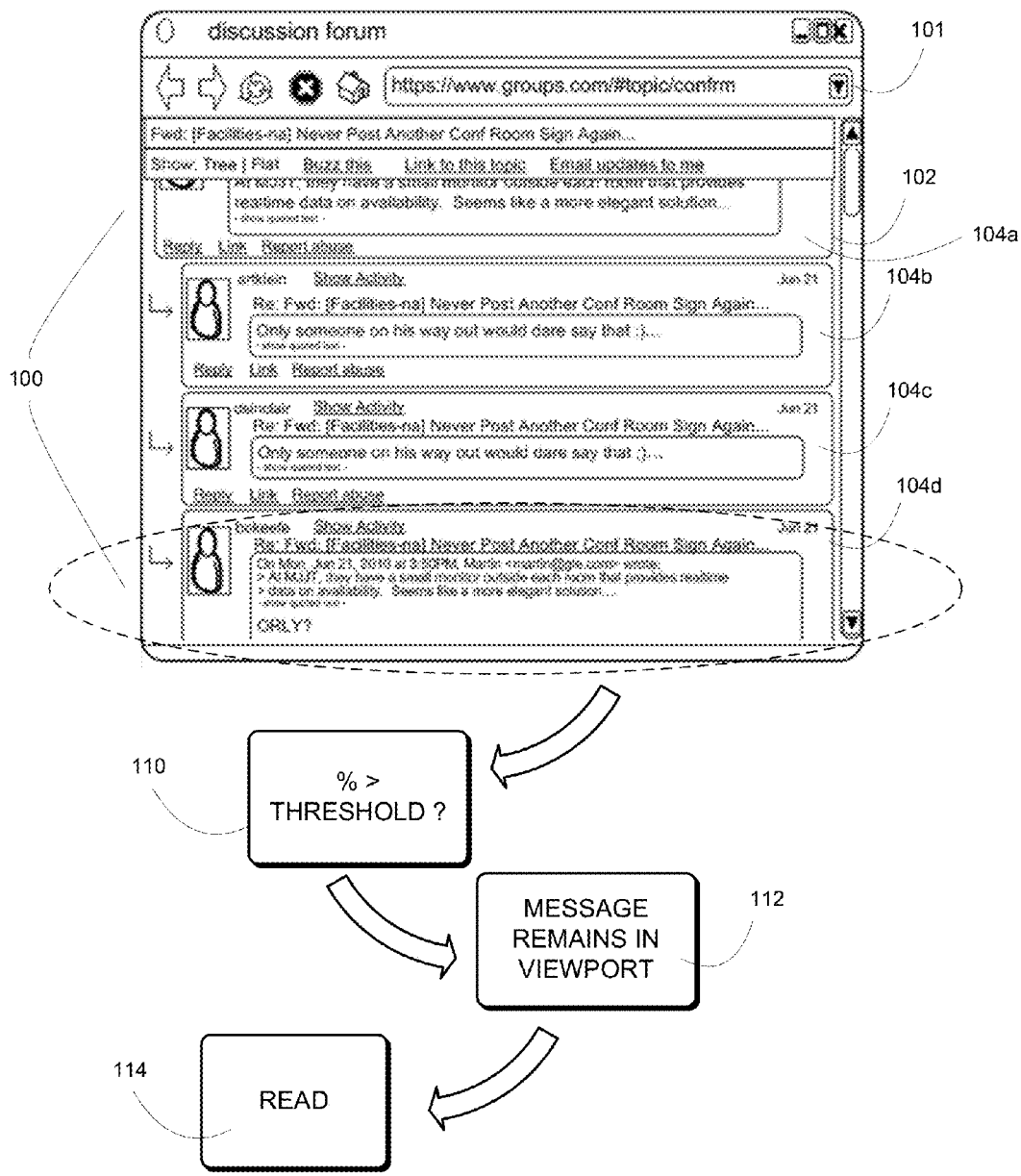

FIG. 1 contains two parts: FIG. 1A and FIG. 1B, which represent the same message list at different points in time. FIG. 1A shows a viewport 100 containing a message list 102. Message list 102 may contain messages that are part of a discussion forum. Viewport 100 is displayed in a Web browser 101 that is running on a computing device. Message list 102 contains messages 104a to 104d. As shown in FIG. 1A, messages 104b and 104c are completely within viewport 100, and messages 104a and 104d are only partially within viewport 100. The remainder of messages 104a and 104d extend beyond the viewport, and therefore can be viewed by scrolling either up or down the message list.

In this example, the read detector may first determine whether a user is scrolling through viewport 100 (in other examples, this need not be done). During scrolling, the read detector assumes that the user is not reading forum messages and, therefore, does not begin the read detection process. After scrolling has stopped, the read detector identifies a message in the viewport, here message 104d in FIG. 1A. The read detector also identifies the other messages in the viewport, and processes them in the same way that message 104d is processed.

Focusing on message 104d (circled in the figures), the read detector determines (106) whether a percentage associated with message 104d is greater than a threshold. In some implementations, the determination may be whether the percentage is greater than or equal to the threshold. The percentage may be a percentage of message 104d that is visible in viewport 100. For example, the read detector may base its determination on whether a majority of the message is in the viewport. Alternatively, the percentage may be a percentage of viewport 100 that is filled by message 104d. For example, if a message is larger than the viewport, the read detector may base its determination on whether a majority of the viewport is filled by the message. In the example of FIG. 1, the percentage (106) is less than the threshold. The read detector therefore infers (108) that message 104d has not been read.

FIG. 1B shows the same viewport 100 and message list 102 as FIG. 1A. In FIG. 1B, however, the user has scrolled down, thereby revealing more of message 104d in viewport 100. In this case, the read detector determines (110) that the percentage of message 104d in viewport 100 (e.g., 50%) exceeds the threshold. Accordingly, the read detector proceeds to determine (112) whether enough of message 104d remains in viewport 100, or enough of viewport 100 is filled by message 104d, for at least a specified amount of time (e.g., 5 seconds). If enough of message 104d remains there for at least a specified amount of time, or enough of the viewport is filled by message 104d, the read detector infers (114) that message 104d has been read, and stores information to that effect in memory. On the other hand, if enough of message 104d does not remain in the viewport or enough of the viewport is not filled by message 104d for the specified amount of time, then the read detector infers that the message has not been read, and proceeds to check other messages in the viewport.

Figure 2:
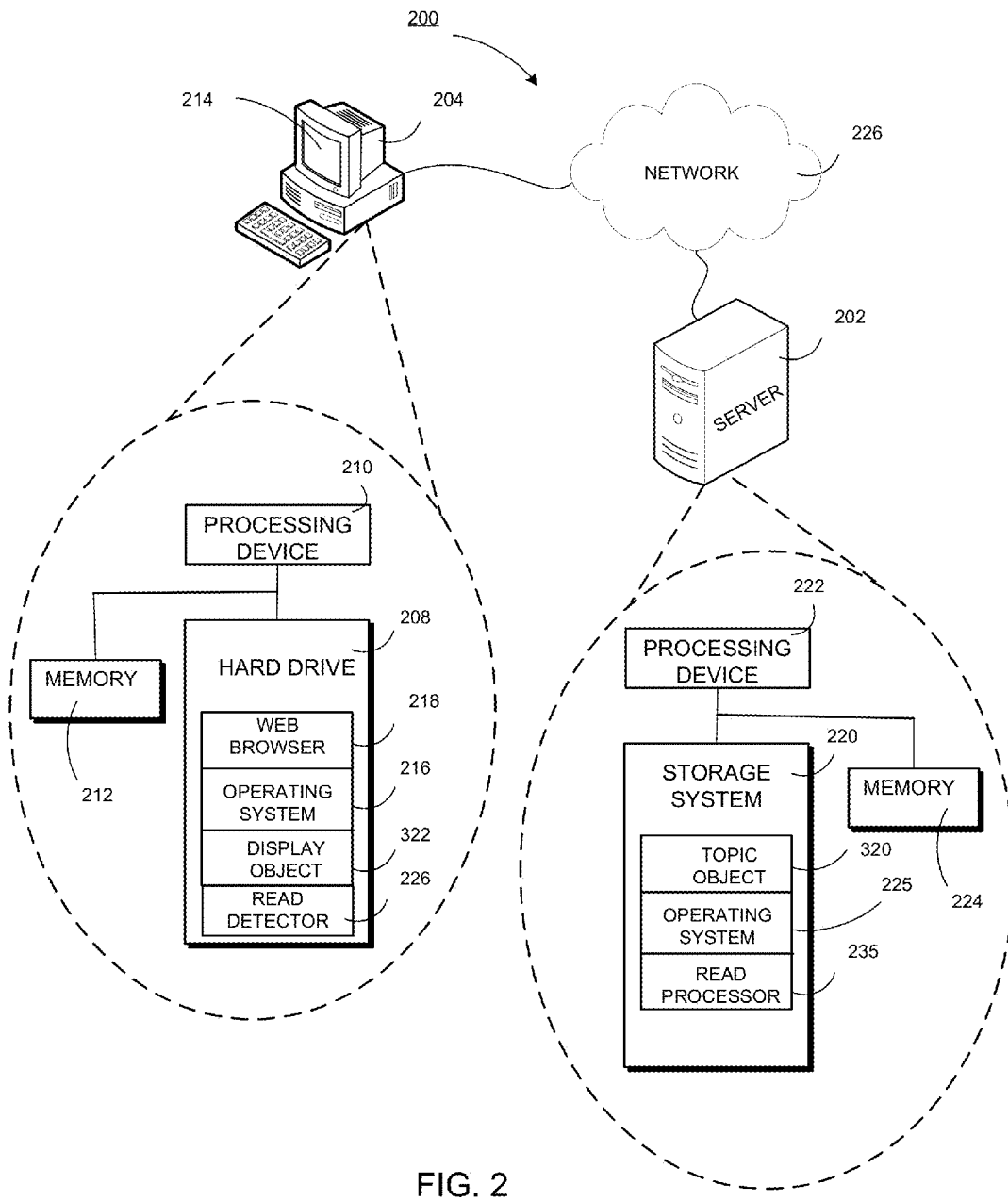
FIG. 2 is a block diagram of a system on which the process of FIG. 1 may be implemented.

FIG. 2 is an example of a system 200 on which the process shown in FIG. 1 may be implemented. The system includes a server 202 and a computing device 204. Computing device 204 and server 202 are connected via network 206. Network 206 may include one or more networks, such as a local area network, a wide area network, and/or the Internet. One or more of the networks that make up network 206 may be wireless, such as a cellular telephone network or a Wi-Fi network.

Computing device 204 may be a desktop, a laptop, a tablet or any other appropriate computing device. Computing device 204 may also be a smartphone. Generally speaking, a smartphone is a mobile device that offers advanced computing capabilities, such as the ability to execute applications and to communicate with server 202 or another appropriate computing device.

Computing device 204 may include a hard drive 208 for storing data and computer programs, and a processing device 210 (e.g., a microprocessor) and memory 212 (e.g., RAM) for executing computer programs. A display screen 214, such as an LCD or a CRT (Cathode Ray Tube) displays, to a user, images that are generated by computing device 204. Display screen 214 may be touch-sensitive, allowing a user to enter information onto the display screen via a virtual keyboard. Alternatively, a physical QWERTY keyboard and scroll wheel may be provided for entering information onto the display screen. Computing device 204, and computer programs executed thereon, may also be configured to accept voice commands, and to perform functions in response to such commands. For example, the process described herein for inferring whether messages in a list have been read may be initiated and controlled, to the extent possible, via voice commands.

Computing device 204 runs an operating system 216, such as a version of MICROSOFT WINDOWS or MAC LEOPARD. Computer programs, including applications, are stored, e.g., in hard drive 208, and execute on top of the operating system. Among these computer programs is a Web Browser 218, such as MICROSOFT INTERNET EXPLORER, GOOGLE CHROME, or APPLE SAFARI. Also among these computer programs is read detector 226 which, as described above, interacts with Web browser 218 to make an inference as to whether one or more messages in a list of messages in a discussion forum has been read.

Server 202 may include a storage system 220 for storing data and computer programs, and a processing device 222 (e.g., a microprocessor) and memory 224 (e.g., RAM) for executing computer programs. Server 202 runs an operating system 225, such as a version of SOLARIS or LINUX. Computer programs are stored, e.g., in storage system 220, and execute on top of the operating system. Among these computer programs is read processor 235, which processes read results obtained by read detector 226.

Server 202 may host, or otherwise provide access to, discussion forums that contain messages that may be processed by read detector 226. That is, a user at computing device 204 may sign onto a Web site hosted by server 202 (or, e.g., for which server 202 is a portal). In response, e.g., through an appropriate HTTP (hypertext transfer protocol) exchange, server 202 may provide forum content, including message text and information associated with individual messages, such as the identity of the poster and the time that the message was posted.

Other examples of computing devices and servers on which the processes described herein may be implemented are provided below.

Figure 3:
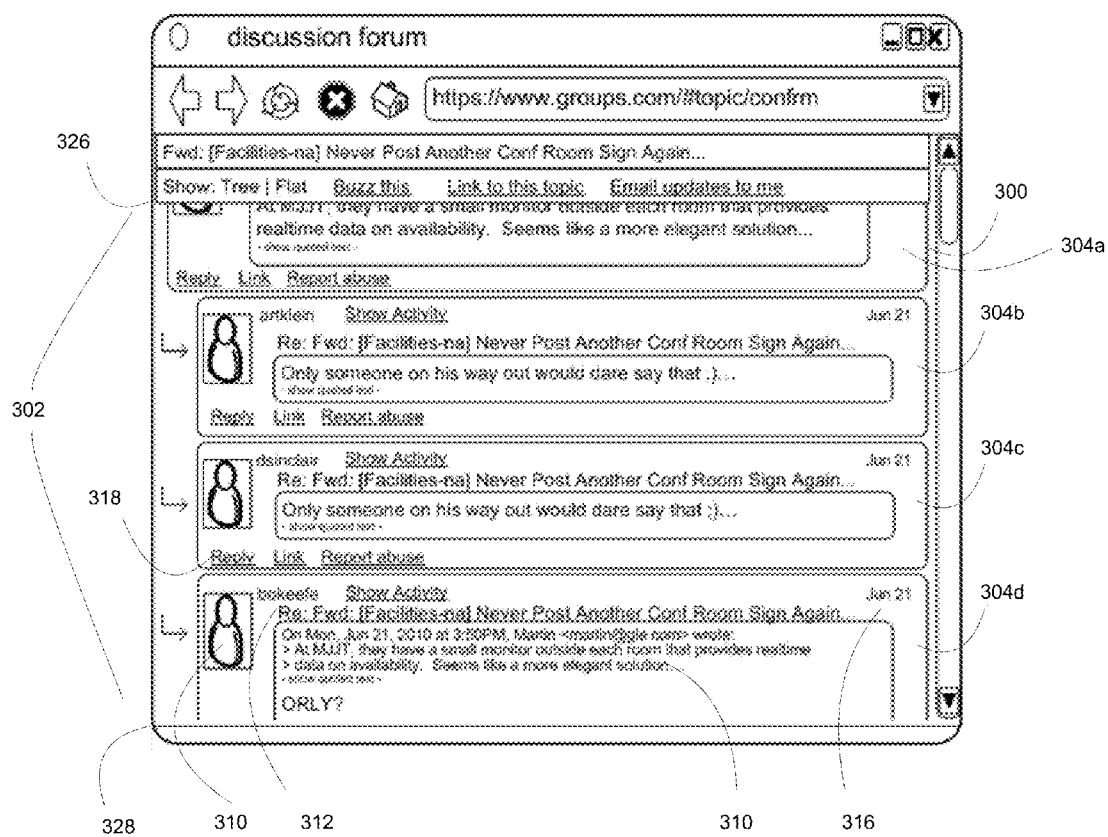
FIG. 3 is a screenshot of a viewport for displaying a message list from a discussion forum.

FIG. 3 shows an example of a message list 300, which may be part of a discussion forum hosted by server 202. In this example, the messages in message list 300 relate to a particular topic in the discussion forum. Viewport 302 contains messages 304a to 304d, which are part of message list 300. The messages may be stored as objects, but are referred to here simply as "messages". In the example of FIG. 3, messages 304a to 304d each contain text 310, an identity 312 of the message poster, an icon 314 corresponding to the message poster, the day 316 that the message was posted, and various hyperlinks, including a link 318 to reply to the message. As shown in FIG. 3, any replies are embedded below the original message resulting in the message hierarchy shown in the figure. For example, reply message 304b is embedded below message 304a. In a "flat view" example (not shown), the messages are displayed in sequence, without hierarchy.

A topic object 320 (FIG. 2) stores data defining the entire thread of messages contained in message list 300. Topic object 320 contains all of the message objects or references to the message objects. Topic object 320 also contains data defining the relationships among messages, e.g., the message hierarchy if the messages are not in "flat view". This data may specify the relationship of each message, if any, to other messages relating to a particular topic in the discussion forum, along with order in which the messages are listed. In this regard, each message may include an identifier (e.g., a number) that specifies its location within the thread of messages that make up a topic in the discussion forum.

If server 202 hosts the discussion forum, storage system 220 stores topic object 320. If server 202 does not host message list 300, topic object 320 may be accessible to server 202, or a copy may reside on server 202. A copy may also reside on computing device 204 or may be accessible thereto.

Topic object 320 may be used to generate a display object 322. The display object 322 may be generated by the Web browser on which the message list is displayed. Display object 322 therefore may be stored on computing device 204. Display object 322 includes information relating to the display of messages from topic object 320. This display information may include, but is not limited to, a location of each message on the display screen (e.g., LCD or CRT display), specifications for message text font/color/size, message border characteristics, and the size of each message when displayed in the viewport. Message location and size are defined in terms of the number of pixels on the display screen that the message occupies vertically. In this regard, the top of the display screen may be viewed as having a pixel position of zero (e.g., the $0^{th}$ row of pixels). If the number of messages in the topic object that precede (e.g., are above) the viewport extend past the $0^{th}$ row, those messages will have a negative pixel position relative the viewport.

The display information is dictated by the Web browser in which the message list is viewed. For example, the Web browser 218 may dictate the size of viewport 302. The size of viewport 302 may change by expanding a window containing Web browser 218, or by reducing that window in size.

Web browser 218 is able to identify, and to provide, the location of the viewport on the display screen. As noted, the location may be the location of the viewport on the display screen defined in terms of pixels from the top or bottom of the display screen. For example, in response to a query from read detector 226, Web browser 218 is able to identify, in terms of pixels, the top 326 of viewport 302 (e.g., pixel row or simply "pixel" 400) and the bottom 328 of viewport 302 (e.g., pixel 900). This information is usable by read detector 226 to identify which messages in the message list are located in the viewport at any given time.

Figure 4:
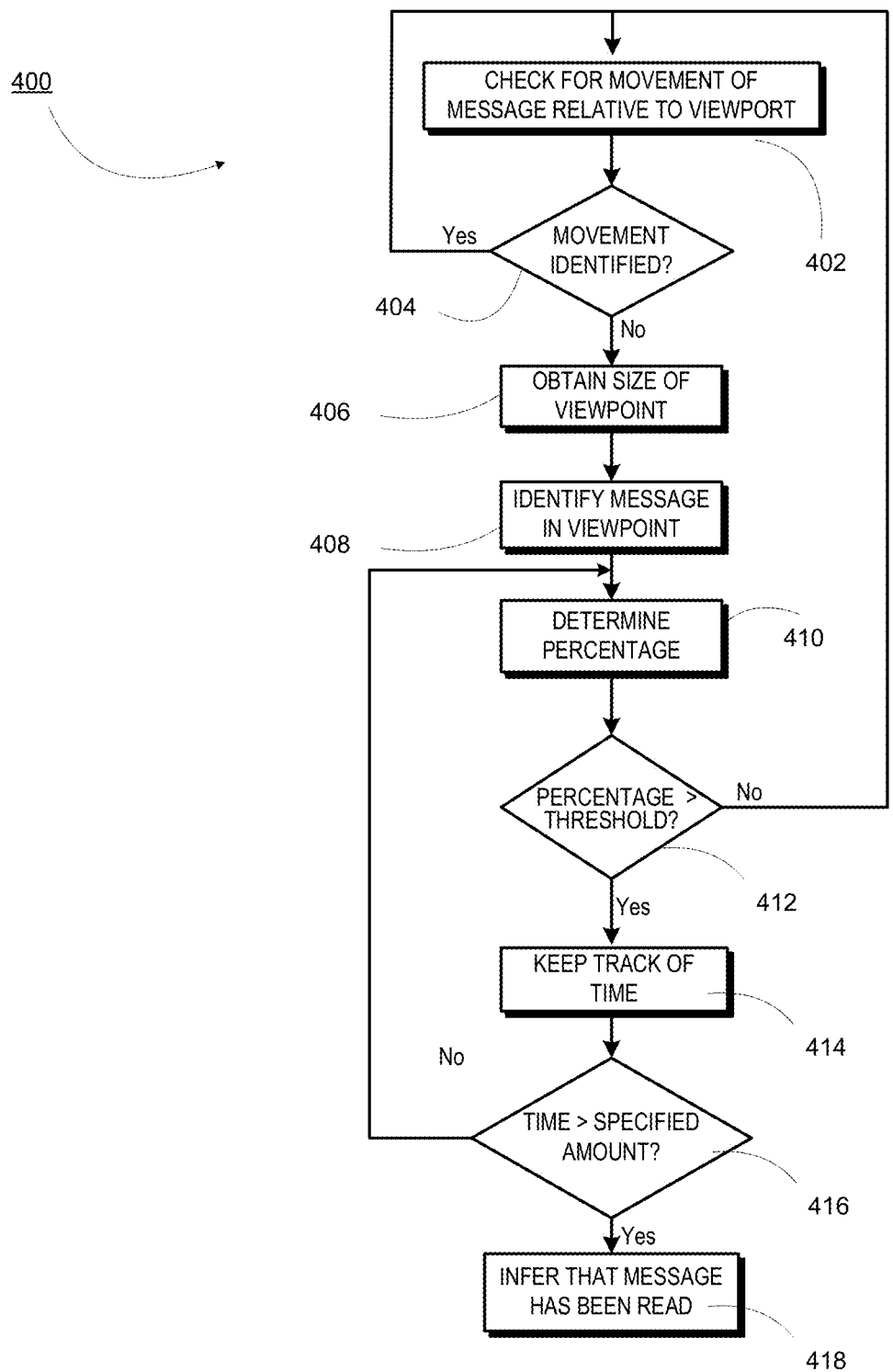
FIG. 4 is a flowchart showing a process for making an inference as to whether a message has been read.

FIG. 4 is a flowchart showing a process 400, which may be performed by read detector 226 on the system of FIG. 2, to infer that a message displayed on a display screen has been read. Read detector 226 may continuously run on computing device 204 or it may be executed, e.g., in response to a command provided from a device remote from computing device 204 (e.g., server 202).

In operation, read detector 226 performs a check (402) to determine if messages have remained stationary relative to the viewport since a last check. For example, read detector 226 determines whether a user has performed some action that could cause the viewport contents to change including, but not limited to, scrolling, resizing the viewport, changing message font size, and collapsing/expanding messages. This check may be performed periodically. In this example, this check may be performed every second; however, any time period may be used provided that it is sufficiently short to infer reading activity before the user has moved-on to other messages. Read detector 226 may perform this check by querying Web browser 218 to determine whether the display object corresponding to the topic object has changed since the last check was performed. For example, the position of message(s) in the display object may have changed and/or the identities of messages in the display object may have changed, either of which would indicate that, e.g., scrolling, has occurred in the message. If read detector 226 determines (404) that the message is stationary, it continues with process 400. Otherwise (404), read detector 226 continues to check for movement of the messages relative to the viewport.

Read detector 226 obtains (406) a size of a viewport 302 (e.g., FIG. 3) that contains the message list. In this example, the size of the viewport refers to the vertical height of the viewport, and is reported in terms of pixels on the display screen. To obtain the size, read detector 226 queries Web browser 218 for the size of viewport 302. Web browser 218 replies with the identity of pixel rows in the display screen that define the top and bottom of the viewport, e.g., pixel 400 and pixel 900, respectively. In other examples, the size of the viewport, and locations of messages contained therein, may be defined in terms of measurements other than pixels on the display screen.

As noted above, the size of the viewport may change, particularly if the Web browser window is re-sized. Therefore, the size of the viewport may be obtained for each iteration of process 400. In other examples, the size of the viewport may not change. In these cases, the size of the viewport may be obtained only once, and retrieved by read detector 226 to perform the remaining actions of process 400.

Read detector 226 identifies (408) messages that are in the viewport. This may be done using a binary search process that is performed using the topic object. In an example, a binary search process involves (a) selecting a test message from among the messages in the topic object and (b) determining a location of the test message relative to the viewport. If none of the test message is in the viewport, (a) and (b) are repeated until at least part of the test message is determined to be in the viewport. In each new iteration of (a) and (b), a new test message is selected from a subset of the messages that is smaller than the subset of the messages used for the previous iteration of (a) and (b). Process 400 proceeds with its processing using a first test message that it determines to be at least partly in the viewport.

Figure 5:
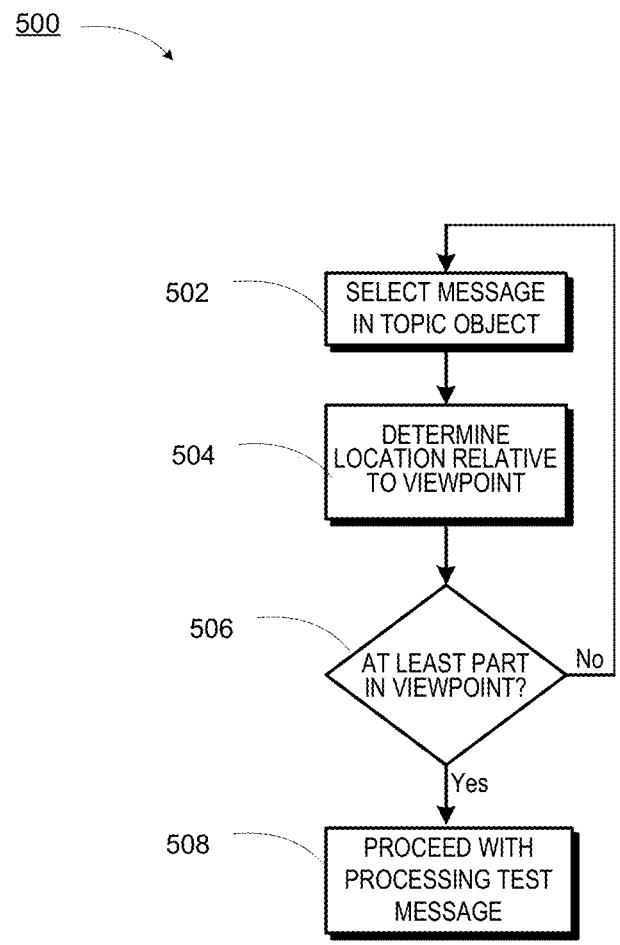
FIG. 5 is a flowchart showing a binary search process for locating a message in a viewport.

FIG. 5 shows an example of a binary search process 500 that may be performed by read detector 226. According to process 500, read detector 226 selects (502) a test message in topic object 320. The test message may be selected from about the middle of the topic object. For example, if the topic object contains 1000 messages, the first selected test message may be message number 500.

Read detector 226 determines (504) a location of the test message relative to the viewport. For example, if the viewport begins at pixel 400 and ends at pixel 900, read detector 226 determines if the test message is within this pixel range. Read detector 226 makes this determination by querying the display object maintained by Web browser 218. If read detector 226 determines (506) that the test message is below the bottom of viewport 302, read detector 226 knows that all messages below the test message cannot be in the viewport. Similarly, if read detector 226 determines (506) that the test message is above the top of viewport 302, read detector 226 knows that all messages above the test message cannot be in the viewport. Accordingly, read detector 226 excludes those messages known not to be in the viewport. Read detector 226 then selects (502) a next test message from about the middle of the resulting subset and repeats actions 504 and 506 until a message is found that is within the viewport or there are no more messages to consider. After a test message is found that is within the viewport, process 400 proceeds (508) using that test message. In each iteration of process 500, the subset of message from which a test message is selected shrinks, e.g., it is halved, causing the process to converge relatively rapidly. In an example, one million messages requires no more than 20 iterations.

In this example, process 500 deems a message to be within the viewport if at least part of the message is within the viewport. So, for example, if the top and bottom of the viewport are at pixels 400 and 900, respectively, and the message begins at pixel 700 and ends at pixel 1200, the portion of the message between pixels 700 and 900 is within the viewport. Therefore, process 500 will deem this message to be in the viewport.

Referring back to FIG. 4, read detector 226 uses the first test message that is determined to be in the viewport to identify any other messages in the discussion forum that may be in the viewport. For example, read detector 226 may successively query messages that precede the test message in sequence to identify other messages in the viewport. This may be done until a message is identified that has no part within the viewport or until there are no more messages to consider. Likewise, read detector 226 may successively query messages that follow the test message in sequence to identify other messages in the viewport. Again, this may be done until a message is identified that has no part within the viewport. After read detector 226 identifies all messages in the viewport, each such message is subjected to the remainder of process 400. For illustration's sake, the following description focuses on processing a single message. The other messages that are determined to be in the viewport may be processed in parallel or in sequence.

Read detector 226 determines (410), for a selected message in the viewport, a percentage of that message that is in the viewport and a percentage of the viewport that is filled by that message. In this example, these percentages relate to the vertical height of the message and viewport only. In this example, read detector 226 uses one of these values in making its inference as to whether the message under consideration has been read. The percentage of the message that is in the viewport may be more determinative for messages that are small relative to the viewport, e.g., for messages that can fit fully within the viewport. The percentage of the viewport that is filled by the message may be more determinative for messages that that are large relative to the viewport, e.g., for messages that cannot fit fully within the viewport.

Figure 6:
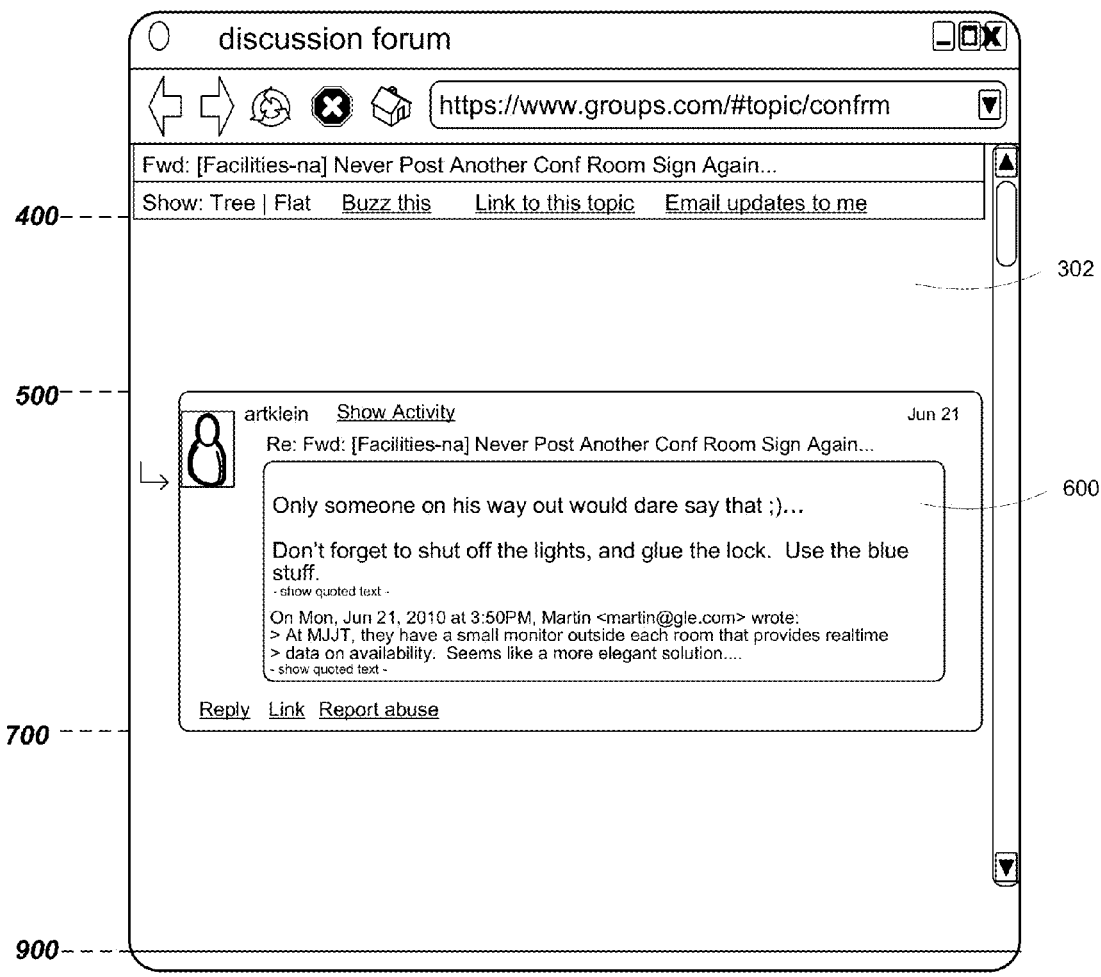
FIGS. 6 to 8 show messages in a viewport and their locations defined in terms of pixels.

Read detector 226 determines the percent of the message that is in the viewport by performing calculation(s) using a boundary of the message and a boundary of the viewport. If a message is entirely within the viewport, read detector may obtain, from display object 322, the size of the message and, knowing the size of the viewport, read detector 226 can readily determine the percentage of the viewport that is filled by the message and the percentage of the message that is within the viewport. For example, in FIG. 6, viewport 302 extends from pixels 400 to 900 (shown in bold italic). Message 600 extends from pixels 500 to 700. Therefore, 40% of the viewport is filled by the message. The percentage of the message that is in the viewport is 100%, since the entire message 600 is in viewport 302.

Figure 7:
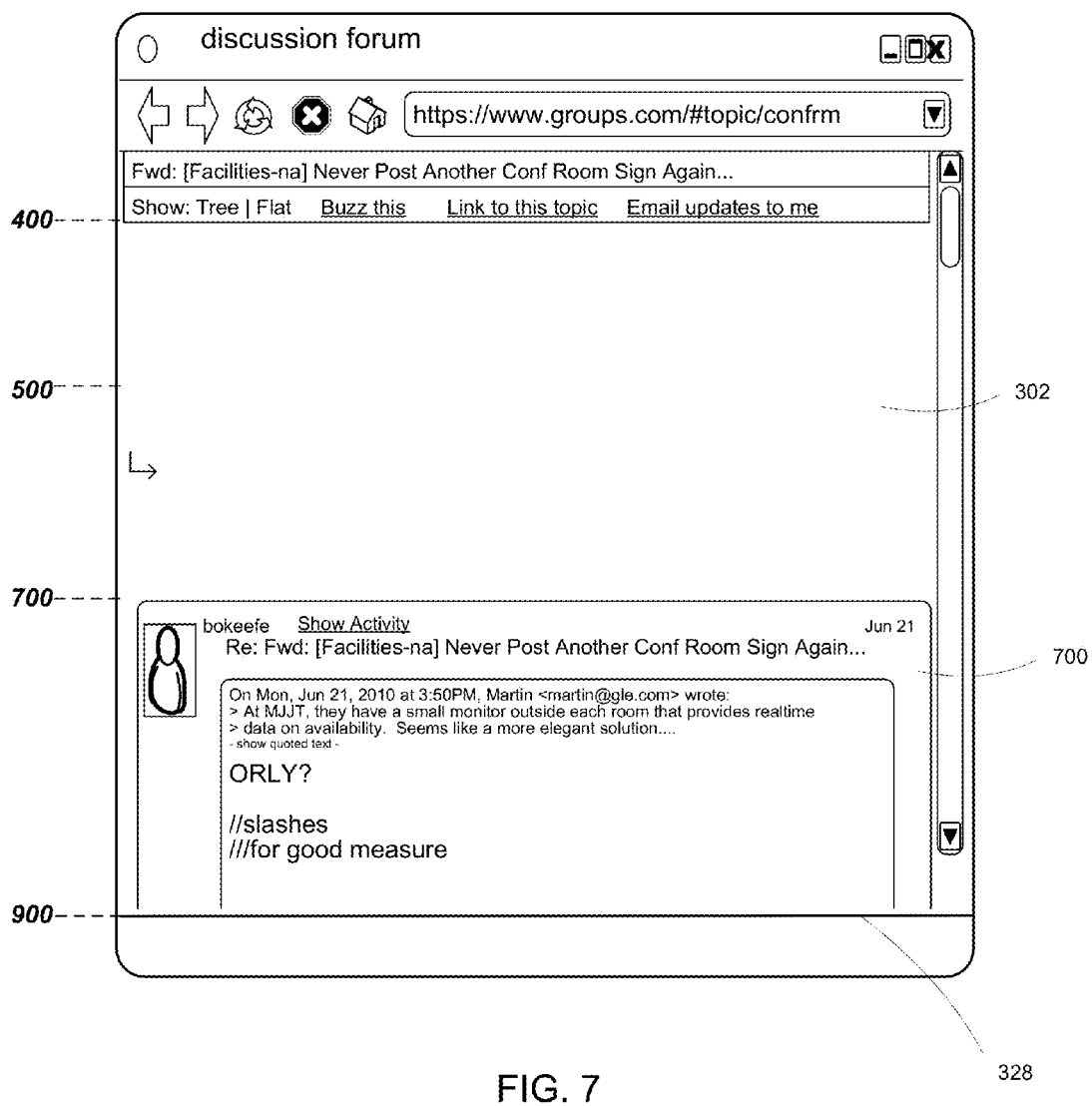
Figure 8:
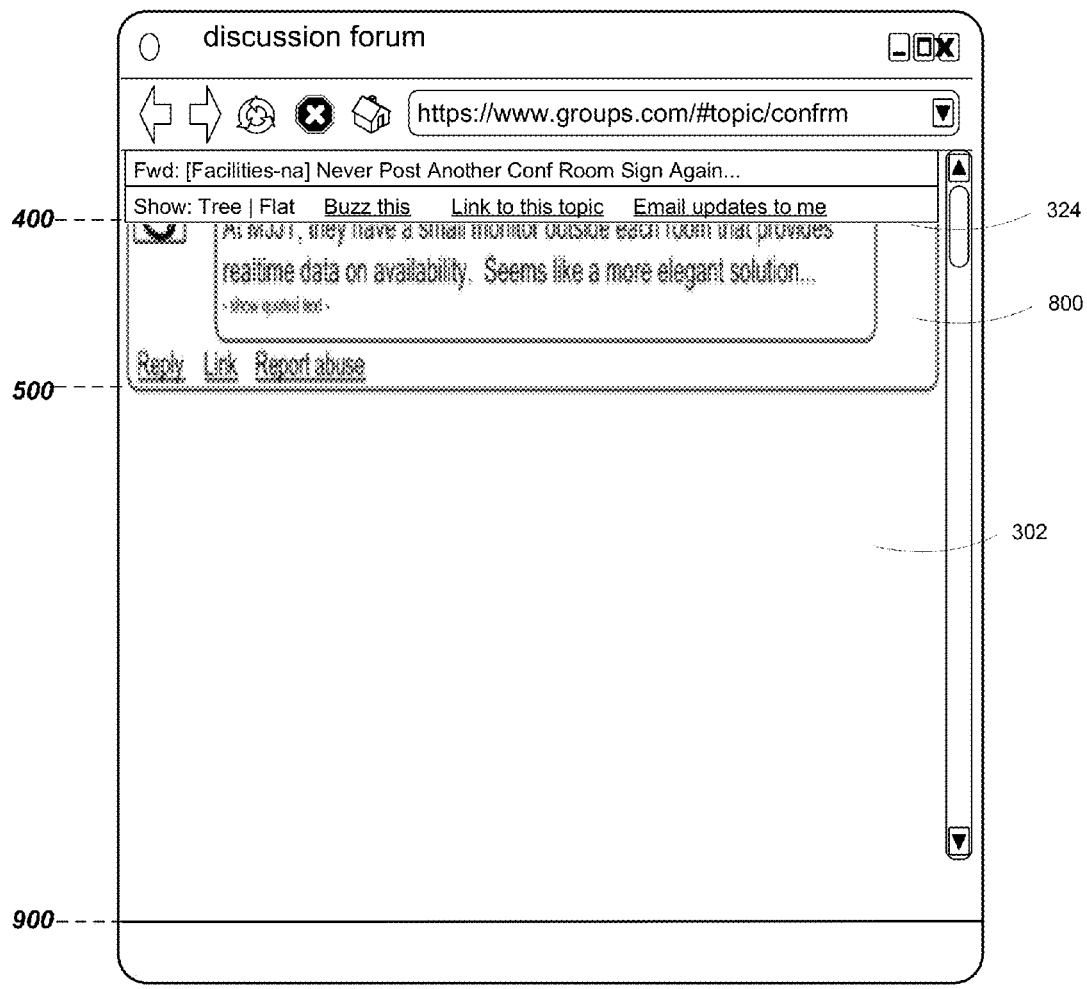

In FIGS. 7 and 8, parts of messages 700 and 800 are outside of the viewport. In FIG. 7, the top of message 700 is at pixel 700 and the bottom extends beyond pixel 900, which is the bottom boundary of the viewport. Since read detector 226 is only concerned with the percentages relative to the viewport, the bottom 328 of viewport 302 is used to determine the percentage of the viewport that is filled by the message. So, in the example of FIG. 7, 40% of the viewport is filled by message 700. Assuming that message 700 extends down to pixel 1200, which is below the viewport, the percentage of message 700 that is in the viewport is 25%.

In the example of FIG. 8, the bottom of message 800 is at pixel 500 and the top of message 800 extends above pixel 400. Since read detector 226 is only concerned with the percentages relative to the viewport, the top 324 of viewport 302 is used to determine the percentage of the viewport that is filled by the message. So, in the example of FIG. 8, 20% of the viewport is filled by message 800. Assuming that message 800 extends up to pixel-100 above the viewport, the percentage of message 800 that is in the viewport is about 16.7%.

Referring back to FIG. 4, to determine (410) a relevant percentage, read detector 226 selects whichever of the following two is greater: the percentage of the message in the viewport or the percentage of the viewport that is filled by the message. In other examples, read detector may use, as the selected value, a combination of (e.g., an average of) the percentage of the message in the viewport or the percentage of the viewport that is filled by the message. Read detector compares (412) the selected value to a threshold. The threshold may be predefined in read detector 226 or it may be set by a user interacting with read detector 226, e.g., on computing device 204. Basically, the threshold is set based on the assumption that, if a certain amount of message text is in the viewport, that message may have been read or may be in the process of being read. Therefore, such a message is determined to be a candidate for further action in accordance with process 400.

If read detector 226 determines (412) that the resulting value is less than the threshold, then the message is deemed not (yet) to be a candidate for further processing. Since the message will not move absent some action, read detector 226 proceeds to check for any action that could cause the viewport contents to change including, but not limited to, scrolling, resizing the viewport, changing the font size, collapsing/expanding messages, and other factors. Thereafter, read detector 226 proceeds according to process 400.

If read detector determines (412) that the resulting value is greater than or equal to the threshold, then read detector 226 begins keeping track of time (414) for the message. In an example operation, the full process of finding new messages in the viewport (actions 408, 410, 412 in process 400) may be performed only when viewport contents have, or may have, changed, e.g., in response to scrolling, resizing the browser, collapsing/expanding messages, new messages, font size changes, and/or other events. Any activity that could cause the contents of the viewport to change in any way marks the viewport as "dirty", and a full check, including actions 408, 410, 412 is performed, which then marks the viewport as "clean". If the viewport is "clean" at the beginning of a check for a particular message, actions 408, 410, 412 may be skipped and the read detector may skip to action 414 by re-using threshold determinations made in the last full check.

To keep track of time, read detector 226 may start a timer for the message or use an ongoing system timer. In any case, read detector determines (416) if the amount of time that has elapsed since time tracking began exceeds a specified amount of time. In an example, this specified amount of time is five seconds (5 s); however, any amount of time may be used. This amount of time may be pre-set in read detector 226 or it may be set from a device that is remote computing device 204, such as server 202.

If the amount of time that has elapsed since tracking began does not exceed the specified amount of time (416), read detector 226 again determines (410) the percentage of that message that is in the viewport and a percentage of the viewport that is filled by that message. If the larger of these continues to exceed the threshold (412), read detector 226 continues keeping track of time for the message. If, on the other hand, the larger of these falls below the threshold before the specified amount of time has elapsed (412), read detector 226 assumes that the message has not been read, and process 400 begins again, as shown in FIG. 4

If the amount of time that has elapsed since time tracking began exceeds the specified amount of time (416), read detector infers (418) that the message has been read. That is, read detector 226 assumes that, since there is a sufficient amount of the message visible to a reader of the forum, and since the message has remained in the viewport for the specified amount of time, that the message must have been, or is being, read. In this case, read detector 226 may store an indication that the message has been read. This information may also be stored in a database (not shown), either at server 202 or elsewhere. Such information may (also) be stored in topic object 320 or elsewhere.

In this regard, read detector 226 may store, in computing device 204, a queue of messages that it determines have been viewed. At an interval (e.g., a regular interval of 120 seconds) or after enough items have been queued (e.g., 20 items), read detector 226 may report this information to read processor 235. Read processor 235, which runs on server 202, may then process this information. One type of processing may include eliminating duplicates among read messages. For example, if a user has viewed the same message previously, that message should not be counted as having been read twice and, therefore, is eliminated from the read message count. Read processor 235 employs user information, such as a browser cookie or a user's Internet Protocol (IP) address to track the user's actions, and thereby identify which user has read which messages. This processing also reduces the need to store a large amount of information persistently in the Web browser.

Read processor 235 also may remove any user-identifiable information from the information and compile message reading statistics. These statistics may include the following: raw counts (e.g. a message has been viewed 1000 times), time-series data (e.g. a graph of how many readings per hour a message has been subjected to over time), and top-N lists (e.g. the top 10 messages in a particular topic or forum).

Figure 9:
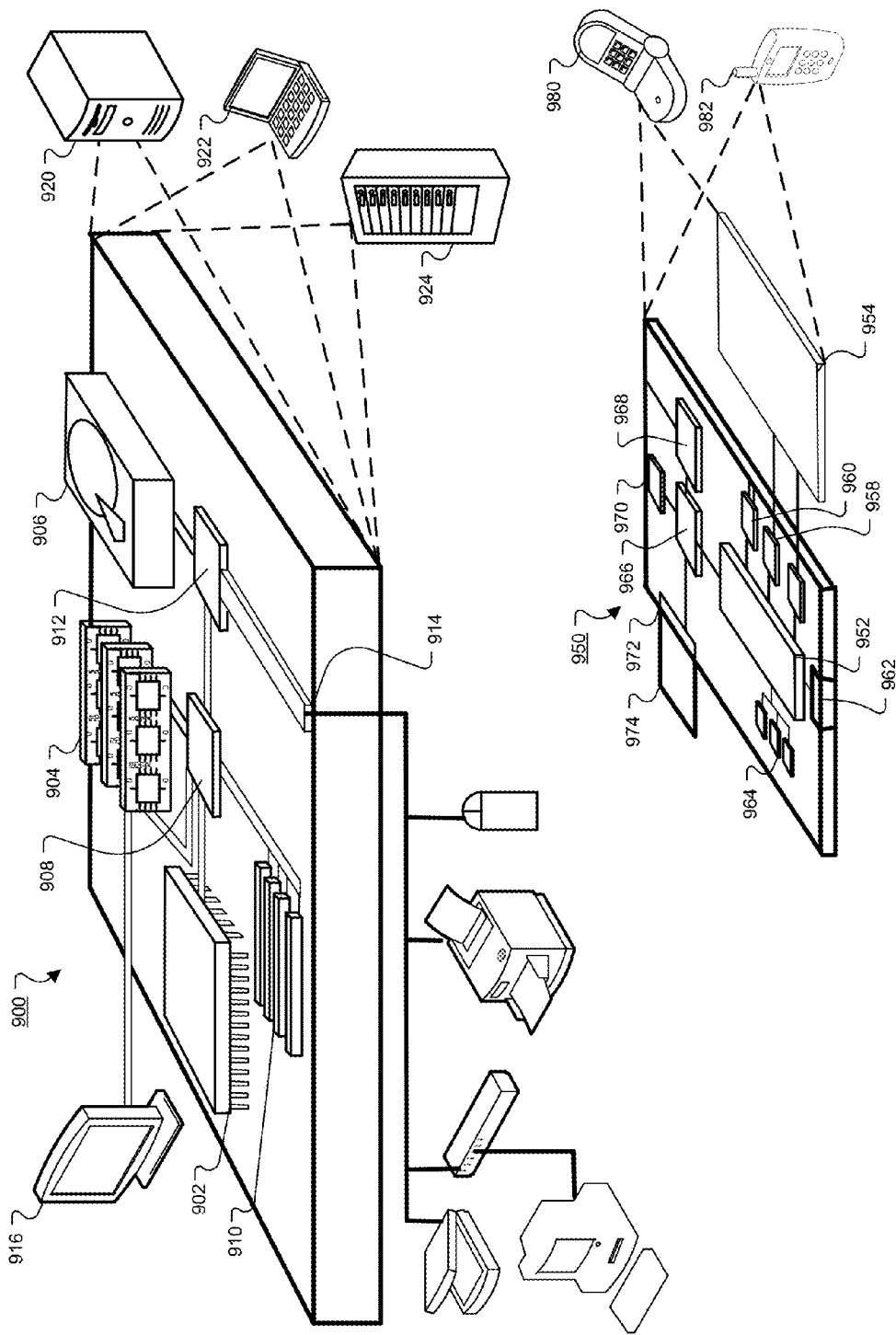
FIG. 9 shows an example of a computer device and a mobile computing device that can be used to implement the processes described herein.

FIG. 9 shows an example of a generic computing device 900 and a generic mobile computer device 950, both which may be used in the process described herein for inferring whether a message has been read. For example, computing device 900 may perform the functions of server 202 or computing device 204 and mobile computer device 950 may perform the function of computing device 204. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution in the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information in the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a computer- or machine-readable medium, such as the memory 904, the storage device 906, memory on processor 902, or a propagated signal. For example, the information carrier may be a non-transitory, machine-readable storage medium.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions in the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information in the computing device 950. The memory 964 can be implemented as one or more of a computer-readable medium or media, a volatile memory unit or units, or a non-volatile memory unit or units. Expansion memory 964 may also be provided and connected to device 950 through expansion interface 962, which may include, for example, a SIMM (Single In Line Memory Module) card interface. Such expansion memory 964 may provide extra storage space for device 950, or may also store applications or other information for device 950. Specifically, expansion memory 964 may include instructions to carry out or supplement the processes described above, and may include secure information also. Thus, for example, expansion memory 964 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 964, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or topic object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are in the scope of the following claims.

The processes described herein are not limited to use with discussion forums, but rather may be used to infer whether any messages in any sort of grouping have been read. For example, the processes may be used to infer reading of an e-mail message among a group of e-mail messages.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also in the scope of the following claims.

What is claimed is:

1. A method performed by one or more processing devices, comprising:
    identifying at least part of a message that is in a viewport of a computing device, the message being part of a list of messages and the viewport showing a part of the list of messages;
    determining a value that is based on the at least part of the message, the value being indicative of whether the message has been read;
    comparing the value to a threshold;
    tracking an amount of time that the at least part of the message is in the viewport if the value meets or exceeds the threshold; and
    inferring whether the message has been read based on the amount of time.

2. The method of claim 1, wherein identifying comprises performing a binary search process on a list of messages that the message is among in order to identify the at least part of a message that is in a viewport.

3. The method of claim 1, wherein the value is based on at least one of a percentage of the message in the viewport or a percentage of the viewport that is filled by the message.

4. The method of claim 3, further comprising:
    determining the percentage of the message in the viewport by performing a calculation using a boundary of the message and a boundary of the viewport.

5. The method of claim 4, further comprising:
    obtaining the boundary of the viewport by querying a Web browser that displays the viewport.

6. The method of claim 5, wherein determining the value comprises selecting whichever of the following is greater: the percentage of the message in the viewport and the percentage of the viewport that is filled by the message.

7. The method of claim 1, further comprising:
    selecting the message by determining that the message has not moved relative to the viewport for at least a period of time.

8. The method of claim 1, wherein the message is in a list of messages; and wherein identifying at least part of the message that is in a viewport comprises:
(a) selecting a test message from among the list of messages;
(b) determining a location of the test message relative to the viewport;
if none of the test message is in the viewport, repeating (a) and (b) until at least part of a selected test message is determined to be in the viewport; and
proceeding with the method using, as the message, a first test message that is determined to be at least partly in the viewport.

9. The method of claim 8, wherein in each new iteration of (a) and (b), a test message is selected from a subset of the messages that is smaller than a subset of the messages used for a previous iteration of (a) and (b).

10. The method of claim 9, wherein in each new iteration of (a) and (b), the subset of the messages excludes messages known not to be in the viewport.

11. The method of claim 1, wherein the message is a first message, and the method further comprises:
identifying at least part of a second message that is in the viewport of the computing device;
determining a second value that is based on the at least part of the second message;
comparing the second value to the threshold;
tracking a second amount of time that the at least part of the second message is in the viewport if the second value meets or exceeds the threshold; and
inferring whether the second message has been read based on the second amount of time.

12. The method of claim 11, wherein identifying the at least part of the second message comprises searching for the at least part of the second message in the viewport starting at a location associated with the first message.

13. One or more non-transitory machine-readable media storing instructions that are executable on one or more processing devices to perform functions comprising:
identifying at least part of a message that is in a viewport of a computing device, the message being part of a list of messages and the viewport showing a part of the list of messages;
determining a value that is based on the at least part of the message, the value being indicative of whether the message has been read;
comparing the value to a threshold;
tracking an amount of time that the at least part of the message is in the viewport if the value meets or exceeds the threshold; and
inferring whether the message has been read based on the amount of time.

14. The one or more non-transitory machine-readable media of claim 13, wherein identifying comprises performing a binary search process on a list of messages that the message is among in order to identify the at least part of a message that is in a viewport.

15. The one or more non-transitory machine-readable media of claim 13, wherein the value is based on at least one of one of a percentage of the message in the viewport or a percentage of the viewport that is filled by the message.

16. The one or more non-transitory machine-readable media of claim 15, wherein the functions further comprise:
determining the percentage of the message in the viewport by performing a calculation using a boundary of the message and a boundary of the viewport.

17. The one or more non-transitory machine-readable media of claim 16, wherein the functions further comprise:

obtaining the boundary of the viewport by querying a Web browser that displays the viewport.

18. The one or more non-transitory machine-readable media of claim 17, wherein determining the value comprises selecting whichever of the following is greater: the percentage of the message in the viewport and the percentage of the viewport that is filled by the message.

19. The one or more non-transitory machine-readable media of claim 13, wherein the functions further comprise:
selecting the message by determining that the message has not moved relative to the viewport for at least a period of time.

20. The one or more non-transitory machine-readable media of claim 13, wherein the message is in a list of messages; and
wherein identifying at least part of the message that is in a viewport comprises:
(a) selecting a test message from among the list of messages;
(b) determining a location of the test message relative to the viewport;
if none of the test message is in the viewport, repeating (a) and (b) until at least part of a selected test message is determined to be in the viewport; and
proceeding using, as the message, a first test message that is determined to be at least partly in the viewport.

21. The one or more non-transitory machine-readable media of claim 20, wherein in each new iteration of (a) and (b), a test message is selected from a subset of the messages that is smaller than a subset of the messages used for a previous iteration of (a) and (b).

22. The one or more non-transitory machine-readable media of claim 21, wherein in each new iteration of (a) and (b), the subset of the messages excludes messages known not to be in the viewport.

23. The one or more non-transitory machine-readable media of claim 13, wherein the message is a first message, and wherein the functions further comprise:
identifying at least part of a second message that is in the viewport of the computing device;
determining a second value that is based on the at least part of the second message;
comparing the second value to the threshold;
tracking a second amount of time that the at least part of the second message is in the viewport if the second value meets or exceeds the threshold; and
inferring whether the second message has been read based on the second amount of time.

24. The one or more non-transitory machine-readable media of claim 23, wherein identifying the at least part of the second message comprises searching for the at least part of the second message in the viewport starting at a location associated with the first message.

25. An electronic system comprising:
one or more processing devices; and
one or more machine-readable media storing instructions that are executable by the one or more processing devices to perform functions comprising:
identifying at least part of a message that is in a viewport of a computing device, the message being part of a list of messages and the viewport showing a part of the list of messages;
determining a value that is based on the at least part of the message, the value being indicative of whether the message has been read;
comparing the value to a threshold;

tracking an amount of time that the at least part of the message is in the viewport if the value meets or exceeds the threshold; and inferring whether the message has been read based on the amount of time.

26. The electronic system of claim 25, wherein identifying comprises performing a binary search process on a list of messages that the message is among in order to identify the at least part of a message that is in a viewport.

27. The electronic system of claim 25, wherein the value is based on at least one of a percentage of the message in the viewport or a percentage of the viewport that is filled by the message.

28. The electronic system of claim 27, wherein the functions further comprise:

determining the percentage of the message in the viewport by performing a calculation using a boundary of the message and a boundary of the viewport.

29. The electronic system of claim 28, wherein the functions further comprise:

obtaining the boundary of the viewport by querying a Web browser that displays the viewport.

30. The electronic system of claim 29, wherein determining the value comprises selecting whichever of the following is greater: the percentage of the message in the viewport and the percentage of the viewport that is filled by the message.

31. The electronic system of claim 25, wherein the functions further comprise:

selecting the message by determining that the message has not moved relative to the viewport for at least a period of time.

32. The electronic system of claim 25, wherein the message is in a list of messages; and wherein identifying at least part of the message that is in a viewport comprises:

(a) selecting a test message from among the list of messages;

(b) determining a location of the test message relative to the viewport;

if none of the test message is in the viewport, repeating (a) and (b) until at least part of a selected test message is determined to be in the viewport; and proceeding using, as the message, a first test message that is determined to be at least partly in the viewport.

33. The electronic system of claim 32, wherein in each new iteration of (a) and (b), a test message is selected from a subset of the messages that is smaller than a subset of the messages used for a previous iteration of (a) and (b).

34. The electronic system of claim 33, wherein in each new iteration of (a) and (b), the subset of the messages excludes messages known not to be in the viewport.

35. The electronic system of claim 25, wherein the message is a first message, and wherein the functions further comprise:

identifying at least part of a second message that is in the viewport of the computing device;

determining a second value that is based on the at least part of the second message;

comparing the second value to the threshold;

tracking a second amount of time that the at least part of the second message is in the viewport if the second value meets or exceeds the threshold; and inferring whether the second message has been read based on the second amount of time.

36. The electronic system of claim 35, wherein identifying the at least part of the second message comprises searching for the at least part of the second message in the viewport starting at a location associated with the first message.

* * * * *